(No Model.)

J. L. ULSH.
BELT TIGHTENER.

No. 492,314. Patented Feb. 21, 1893.

WITNESSES:
Hubert E. Ack.
E. C. Duffy

INVENTOR
John L. Ulsh
BY O. E. Duffy
ATTORNEY.

THE NORRIS PETERS CO., PHOTO-LITHO., WASHINGTON, D. C.

UNITED STATES PATENT OFFICE.

JOHN L. ULSH, OF WABASH, INDIANA, ASSIGNOR OF ONE-HALF TO WILLIAM P. JONES, OF SAME PLACE.

BELT-TIGHTENER.

SPECIFICATION forming part of Letters Patent No. 492,314, dated February 21, 1893.

Application filed May 19, 1892. Serial No. 433,624. (No model.)

*To all whom it may concern:*

Be it known that I, JOHN L. ULSH, of the city of Wabash, in the county of Wabash and State of Indiana, have invented certain new and useful Improvements in Belt Clamps and Tighteners; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in belt tighteners or stretchers.

The object of the invention is to provide an improved belt stretcher, exceedingly, cheap, simple and durable in construction and composed of a minimum number of strong parts, and which will be exceedingly, strong, and powerful and efficient in action.

The invention consists in certain novel features of construction and combinations of parts more fully described hereinafter and particularly pointed out in the claims.

Figure 1:
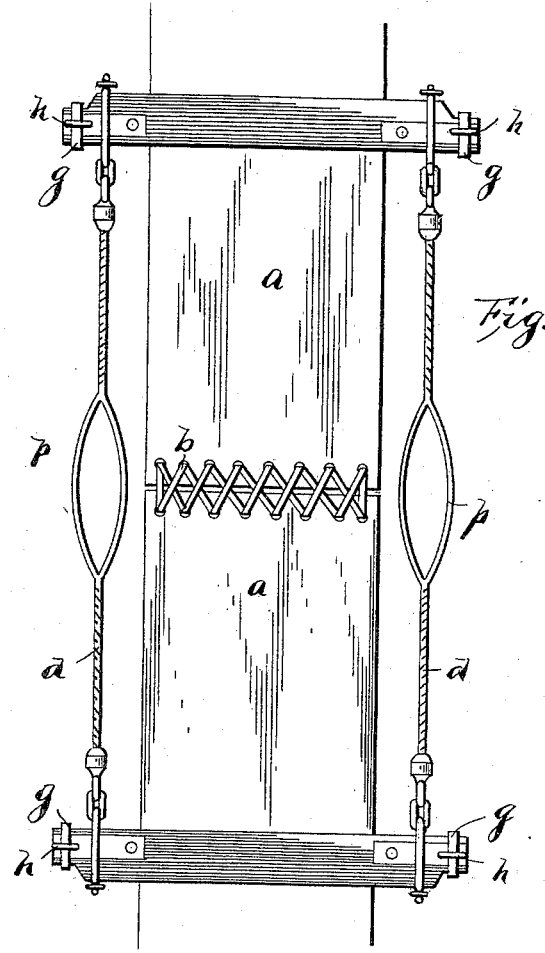
Figure 2:
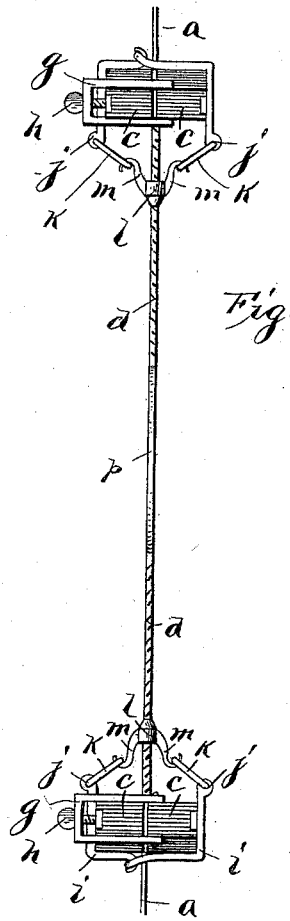
Figure 3:
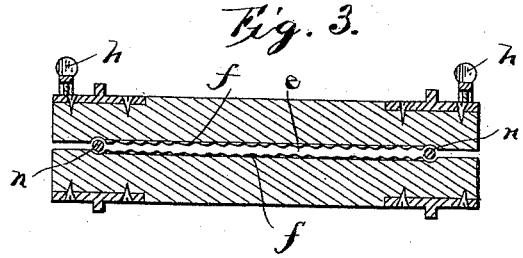

Referring to the accompanying drawings;—Figure 1 is a plan view showing the device as in use stretching a belt. Fig. 2 is an edge view showing the device as in use, and Fig. 3 is a sectional view taken through the clamping jaws.

In the drawings, the reference letter $a$, indicates a belt having its free ends inserted in the jaws of the tightener.

$b$, indicates the lacing or sewing uniting the ends of the belt.

The tightener is composed of two pairs of jaws $c$, to grasp the opposite portions or ends of the belt and the screw rods $d$, uniting said pairs of jaws and so connected therewith as to draw the jaws of each pair tightly together and draw the pairs of jaws toward each other when the rods are screwed up. The inner face of the jaws are roughened so as to firmly grasp the belt and prevent the jaws slipping. This is preferably accomplished by securing fine wire gauze or netting $f$ on the inner faces of the jaws. Clevises $g$, are pivoted to one jaw of each pair so as to swing up over the other jaw, and each clevis is provided with a set screw $h$, by means of which the two jaws can be clamped on the belt while the tightening rods are being adjusted.

$i, i$, indicate arms secured respectively to opposite ends of each jaw and extended downwardly at the outer sides thereof and corresponding arms $i$, on the jaws are suitably loosely joined together as shown so that the jaws can swing open or close. This joint is preferably formed by an eye in the end of one arm or rod $i$, and a hook on the end of the other rod entering said eye. The opposite ends of these rods are extended forwardly beyond the sides of the jaws and are provided with eyes $j$, receiving the loose loops or links $k$.

$l$, indicates nuts on the oppositely threaded portion of the rods $d$. These nuts are provided with hooks $m$, adapted to receive the links $k$.

When the jaws have been secured on the ends of the belt by means of the clevises $g$ and set screws $h$, the oppositely threaded adjusting rods are inserted between the jaws through the openings $n$, and the links $k$, are hooked onto the hooks $m$ and then the rods $d$, are rotated by means of the handle portions $p$, or a bar inserted through said open portion $p$. This rotation of the rods $d$ draws the nuts $l$, toward each other and thereby through the medium of the links $k$ and rods $i$, drawing the jaws tightly onto the belt and at the same time drawing the pairs of jaws toward each other. It will thus be observed that the more force exerted on the rods $d$, the tighter the jaws will be clamped onto the belt. The construction is of the utmost strength and simplicity and by means of it great force can be exerted on the belt without danger of the jaws slipping.

The device can be used for many purposes such as tightening the belts on the pulleys, or fitting the belts on pulleys so that it can be sewed or laced at the proper point, or for taking up all slack.

It is evident that various slight changes might be made in the form, arrangement and construction of the parts described without departing from the spirit and scope of my invention, hence I do not wish to limit myself to the precise construction herein set forth, but consider myself entitled to all such changes as fall within the spirit and scope of my invention.

Having thus fully described my invention, what I claim as new, and desire to secure by Letters Patent of the United States, is—

1. The tightener consisting of the clamps, each composed of two jaws pivoted or joined to open and close and having forwardly extending arms provided with links, and the threaded rods having the nuts provided with hooks to receive said links, and operate substantially as described.

2. In combination the jaws provided with the clevises and screws to clamp the jaws together, the rods secured to the jaws and loosely united at their rear ends to form hinges for the jaws and having the forward extensions provided with loose links, and the tightening rods provided with nuts to which said links are detachably secured.

In testimony that I claim the foregoing as my own I affix my signature in presence of two witnesses.

JOHN L. ULSH.

Witnesses:
JOHN H. DICKEN,
VALENTINE FREISING.